United States Patent [19]

Steilen

[11] 4,196,779
[45] Apr. 8, 1980

[54] DISK BLADE ASSEMBLY

[75] Inventor: Ronald M. Steilen, Ankeny, Iowa

[73] Assignee: Deere & Company, Moline, Ill.

[21] Appl. No.: 908,741

[22] Filed: May 23, 1978

[51] Int. Cl.² .......................................... A01B 71/04
[52] U.S. Cl. ................................. 172/604; 172/126; 308/181
[58] Field of Search ............... 172/126, 127, 128, 129, 172/130, 131, 132, 604; 308/19, 181, 191

[56] References Cited

U.S. PATENT DOCUMENTS

| 692,334 | 2/1902 | Owens | 308/181 |
|---|---|---|---|
| 747,754 | 12/1903 | Myers | 172/126 |
| 1,217,423 | 2/1917 | Dickinson | 308/19 |
| 2,005,547 | 6/1935 | Johnson | 308/181 |
| 2,105,120 | 1/1938 | Johnson | 308/19 X |
| 3,183,046 | 5/1965 | Hyland | 308/19 |
| 3,397,933 | 8/1968 | Hatcher | 308/181 |

Primary Examiner—Richard J. Johnson

[57] ABSTRACT

An improved assembly is provided for mounting a disk blade to the drawbar or standard of a furrow opener on a grain drill, planter or similar implement. A bearing support is attached to the drawbar. A bearing includes an outer race held by the bearing support, an inner race extending axially beyond the support and a single disk blade receiving bolt depending from the inner race. A disk blade is secured on the bolt between the inner race and a securing nut threaded on the end of the bolt so that the bolt, disk blade and inner race rotate together about the axis of the bolt. Since the bearing is not riveted or otherwise supported on the disk blade, the blade can be removed from the bolt and replaced easily and quickly without having to replace the bearing. The bearing case normally riveted to the disk blade is eliminated increasing the clearance between blades for better flow of dirt and trash.

3 Claims, 3 Drawing Figures

DISK BLADE ASSEMBLY

BACKGROUND OF THE INVENTION

The present invention relates generally to an implement utilizing disk blades. More specifically it relates to a disk blade mounting assembly.

Various disk devices are used extensively for tilling and planting. For example, a single or double disk assembly is commonly used as a furrow opener for a planter or drill. A drawbar or frame assembly attached to the implement carries a shaft which supports the disk blade. Typical of the previous devices, the blade rotates about the shaft on a bearing that is mounted in a case, which in turn is riveted to the disk blade.

With the previous devices, the bearing generally is thrown away when the disk blade is replaced because the bearing case is riveted to the blade. Disposing of the bearing when it is not worn out results in added expense and waste. Additionally, the bearing case protrudes from one side of the blade so that clearance between adjacent disk blade assemblies is reduced, resulting in an increased tendency for dirt and trash to become trapped. In such devices, the bearing is offset from the center of the plane of rotation of the disk blade cutting edge, and fairly large moments are encountered resulting in uneven bearing loading and decreased bearing lifetime. Often, the bearing cap will crack under the load.

It is therefore an object of the present invention to provide an improved mounting for a disk blade.

Another object of the invention is to provide a mounting which simplifies as well as reduces the cost of replacing disk blades.

It is a further object to provide a mounting in which the disk blade can be quickly and easily removed from the bearing assembly and the implement by simply removing a nut from a bolt. The bearing is not secured directly to the blade but is supported in a mounting on the implement so the bearing does not have to be replaced with the blade.

It is still another object of the invention to provide a mounting assembly which eliminates the expense and problems of cracking of the bearing case. The assembly has an overall decreased width to increase the clearance between adjacent disk blades. To reduce loading and wear, the bearing is located close to the plane of rotation of the cutting edge.

These and further objects and advantages will become apparent from the description of the preferred embodiment in conjunction with the drawings.

DESCRIPTION OF THE PREFERRED EMBODIMENT

Figure 1:
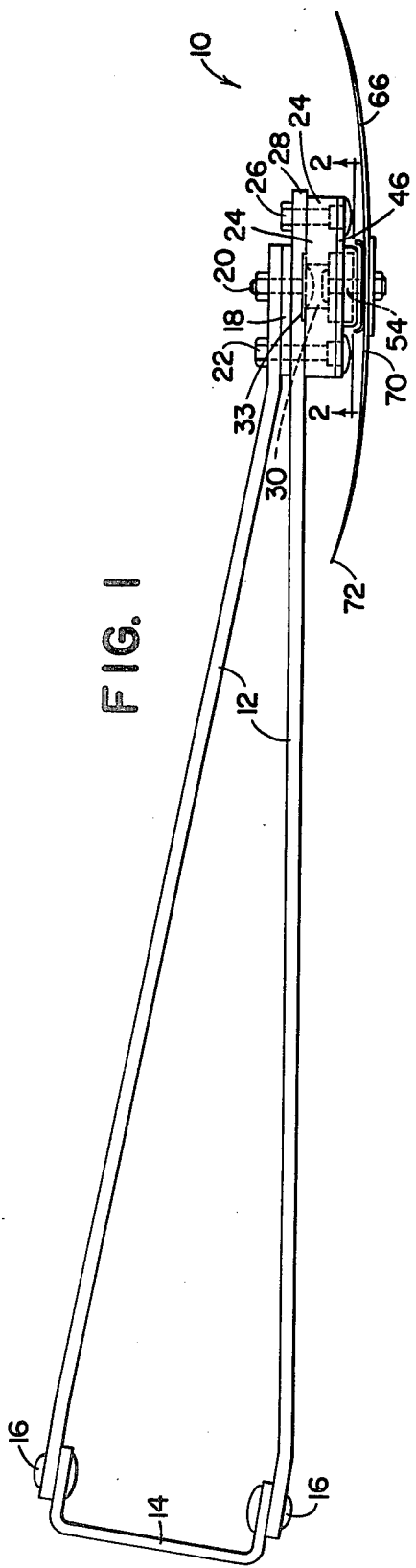
FIG. 1 is a top view of a furrow opener drawbar assembly incorporating the present invention.
Figure 2:
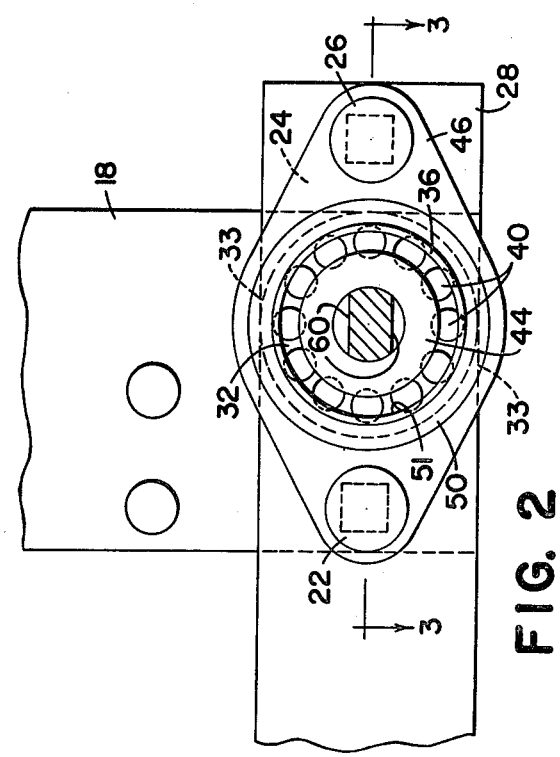
FIG. 2 is an enlarged side view, partially in section, of the disk portion of the assembly shown in FIG. 1 but with the disk blade assembly removed and as taken along the line 2—2 of FIG. 1.

Referring to FIGS. 1 and 2 of the drawings, a disk blade assembly, generally designated by reference numeral 10, is shown mounted on furrow opener drawbar arms 12. Such a drawbar may be mounted on a drill, planter or the like. Although the invention is described and illustrated as a single disk opener, one may appreciate that the invention is not necessarily so limited and may be used with a double disk opener and other devices requiring a disk blade. Arm members 12 are spaced apart by cross brace 14 connected to the leading end of the arms by bolts or rivets 16 which allow arms 12 to pivot thereabout to raise and lower assembly 10. The brace 14 is connected to the implement (not shown) in a conventional manner.

A boot support bracket 18 is secured between arms 12 near the trailing end of the drawbar by bolt 20 which passes through aligned holes in the arms and bracket. Step bolt 22 also aids in securing the boot support bracket 18 between the arms.

A metal bearing support member 24 having a widened central section and tapered ends is secured at one end by the step bolt 22 to the outside face of the outer arm 12. A second step bolt 26 passing through support 24 and through a hole in an extended portion 28 of the arm secures the opposite end of the support 24. The central section of support member 24 has a generally circular, central aperture 30 with a shallow annular and axially outwardly facing bearing-support seat 32 having an inwardly facing annular shoulder 31. The central section of support 24 is somewhat larger than arm 12 and includes upper and lower shoulder portions 33 that abut against the upper and lower edges of the arm 12.

Mounted in bearing support 24 is a bearing 34. Bearing 34, preferably a ball bearing, includes an outer race 36 seated against the seat 32 and shoulder 31, an inner race 38, and ball or roller members 40 interposed between the races. Inner race 38 includes a central bolt or shaft receiving bore 42 axially aligned with the central aperature 30 when the bearing 34 is supported on the seat 32. Race 38 includes a portion 44 which extends axially beyond the plane of the outwardly facing side of race 36. As discussed in detail later, portion 44 provides an axially extended surface against which part of the disk assembly is secured.

Figure 3:
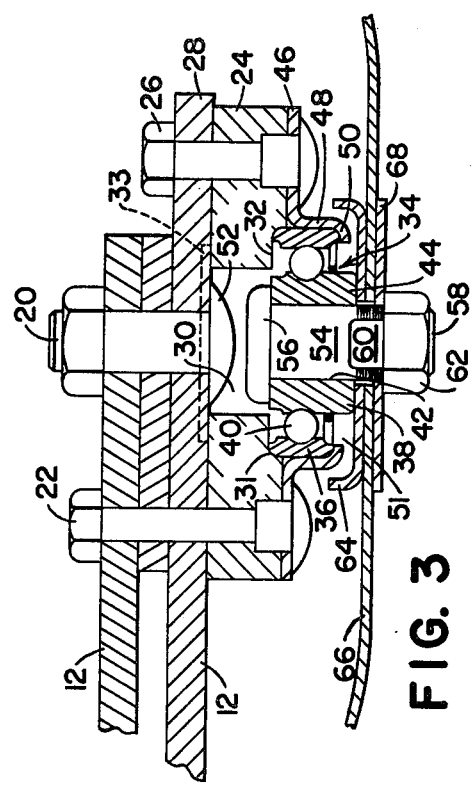
FIG. 3 is a sectional view of the disk portion taken substantially along the line 3—3 of FIG. 2.

Outer race 36, and thus the entire bearing 34, is secured to the bearing support member by a bearing cap or flangette 46. Cap 46 preferably is fashioned from sheet metal and has a shape which as viewed in FIG. 3 conforms generally to the shape of the bearing support member 24. Cap 46 has a circular projection 48 with a flange 50 defining a circular opening 51 which is aligned with bolt receiving bore 42. As evident from FIG. 3, outer race 36 is rigidly held between the support seat 32 and flange 50 when the bearing cap 46 is assembled around bearing 34. The step bolts 22 and 26 secure the bearing cap 46 to the support member 24 as well as the support member to the arms 12. Aperture 30 of bearing support member 24 is substantially aligned with and accommodates head 52 of bolt 20.

A blade receiving bolt or shaft 54 with head 56 is positioned within inner race 38 and extends outwardly beyond race extension portion 44. Aperture 30 provides clearance so bolt 54 and inner race 38 can rotate freely together without interference from support member 24. The bolt 54 includes a threaded end 58 having opposed flats 60. Threaded end 58 receives a blade securing nut 62.

A cup-shaped dirt shield 64 mounted on bolt 54 abuts against the end of the inner race extension 44 which spaces the shield from flange 50 of bearing cap 46. The shield 64 extends partially around the circular projection 48 to protect the bearing 34 from dirt and other harmful materials.

A disk blade 66 is mounted on bolt 54 in contact with dirt shield 64. Blade 66 has a centrally located oblong hole that conforms to the threaded end 58 and has parallel edges engageable with flats 60 so that bolt 54 is constrained to rotate with disk blade 66. A reinforcing washer 68 is placed over the bolt 54 next to blade 66. The entire assembly including inner race 38, shield 64, blade 66 and washer 68 are secured between head 56 and nut 62 by threading the nut on threaded end 58 of bolt 54. The assembly freely rotates within outer race 36 about the axis of the bolt 54 as the blade is pulled through the soil.

Blade 66 has an offset center 70 to accommodate the bearing assembly and to decease the lateral distance between the center of the plane of rotation of the cutting edge 72 and the bearing 34. By eliminating the bearing case that heretofore has been riveted to the blade, the problems and expense of cracked cases is eliminated. Also, cap or flangette 46 is less expensive to manufacture than the previous cases that are riveted to the blade.

To assemble the unit, the boot support bracket 18 is first secured in position between arms 12 with bolt 20. Bolt 54 is inserted through aperture 42 of bearing 34. The bearing is supported on seat 32 of support member 24. Bearing cap 46 is positioned over member 24 with flange 50 abutting against outer race 36 of the bearing. Bolts 22 and 26 are inserted through holes in the case 46, support 24 and the drawbar 10, with bolt 22 also passing through a hole in bracket 18. The nuts are threaded on the bolts and tightened to draw bearing cap 46 against the support member 24 and the support member against the drawbar arm 12. Outer race 36 is thus secured between flange 50 and support seat 32. Shoulders 33 of member 24 project above and below arm member 12 to aid in positioning and securing the support member 24 to the drawbar. Dirt shield 64 is positioned on bolt 54 and abuts against the inner race 38. The oblong disk blade opening is aligned with the mating threaded end 58 and positioned on bolt 54 against shield 64. Reinforcing washer 68 is placed over the bolt and nut 62 is threaded on end 58. Bolt 54 can be pushed back from the race 38 only a short distance until head 56 contacts head 52 of bolt 20, and therefore the end 58 remains axially extended for easily receiving the components thereon. To tighten nut 62 one only has to grasp the blade 66 to prevent bolt 54 from turning and rotate the nut. Once nut 62 is tightened, inner race 38, shield 64 and blade 66 are secured between head 56 and reinforcing washer 68 for rotation therewith. Extension portion 44 of the inner race 38 abuts against dirt shield 64 to position it outwardly from flange 50 and prevent contact therewith as the shield rotates with the blade and inner race.

After extended periods of operation, disk blade 66 can become worn or damaged. To replace the blade, nut 62 is unthreaded from bolt 54 and the washer 68 and blade 66 are removed. A new blade is positioned on the bolt, the washer placed next to the blade on the bolt, and the nut threaded on the threaded end 58 to secure the assembly. The blade 66 is therefore quickly and easily replaced without having to replace the bearing 38 or having to remove numerous rivets or bolts. No bearing case protrudes from the side of the blade. Only the nut 62 and reinforcing washer 68 on end 58 extend beyond the outer plane of the disk blade 66 so that in operation free flow of material past the blade is maintained. Also by eliminating the bearing case that heretofore has been riveted to the blade, the expense and problems of cracking involved with such a case are eliminated. Bearing cap 46 is easily and inexpensively manufactured and facilitates easy assembly of the bearing 34 in mount 24.

By simply unthreading the nuts from bolts 22 and 26 and pulling the bearing cap 46 away from the bearing support member 24, the bearing 34 can be removed from support seat 32. Bolt 54 can be removed and the bearing replaced if desired after nut 62 is unthreaded. The entire assembly therefore can be disassembled easily for inspection and any replacement of parts necessary by unthreading the nuts on several easily accessible bolts.

The bearing support member 24 is connected to the drawbar 10 by bolts 22 and 26 on opposite sides of the axis of rotation of bolt or shaft 54 thereby providing lateral strength and reducing the stress that would be encountered in the drawbar if a single bolt or shaft were used to mount the bearing. The increased strength of the mounting using bearing support member 24, coupled with the reduced moments as a result of decreasing the distance between the center of the plane of rotation of the cutting edge and the bearing 34, provide a stable, long lasting assembly that smoothly trails the implement.

The bearing 34 is easily mounted to the drawbar or standard of the implement, and the disk blade is attached using a single bolt 54 which passes through the bearing. The need for a bearing case or the like riveted or bolted to the disk blade is eliminated so that it is possible to easily replace the blade without replacing the bearing. The overall strength of the mounting is increased over previous units that utilize a riveted case, and cracking of the mounting is reduced. Additional clearance is obtained between disk blade assemblies because the overall width of each assembly is reduced. The arrangement of bearing cap 46 and dirt shield 64 effectively prevent dirt and other harmful substances from entering the bearing.

I claim:

1. An assembly for mounting a disk blade on a drawbar member of an implement for rotation about an outwardly extending axis comprising:

a bearing support member connected to the drawbar member and including an outwardly facing surface and a stepped bore defining an annular shoulder recessed inwardly from the surface;

a bearing having an inner race with a central aperture and an outer race concentric with the inner race, said outer race having axially inwardly and outwardly facing edges, wherein the distance between the edges is substantially greater than the distance between the shoulder and the surface, and a clamping means releasably engaging the outwardly facing edge of the outer race and non-rotatably positioning the inwardly facing edge against the shoulder with a major portion of the outer race extending outwardly beyond the surface, the outer race supporting the inner race for rotation about the axis;

a shaft extending through the central aperture of the inner race for rotation therewith about the axis and including an axially extended blade receiving end for receiving the disk blade; and means for securing the disk blade on the shaft between the inner race and the blade receiving end for rotation with the shaft and the inner race.

2. A disk blade assembly for mounting on an implement frame comprising:

a bearing support member carried on the frame and including an outward face having an annular recessed portion defining a bearing seat;

a bearing having concentric first and second races, said first race including a first edge positioned within said bearing seat and a second edge extending outwardly beyond the face a distance substantially greater than the depth of the recessed portion, said first race carrying said second race for rotation relative to said first race about an axis;

a cap for non-rotatably securing said first race to said support member, said cap including a flange for contacting the second edge and urging the first edge against the bearing seat;

a shaft member secured to said second race and extending outwardly along said axis for rotation thereabout, said shaft member including an outer end;

a disk blade including an apertured central portion receiving said outer end, and a peripheral cutting edge generally defining a plane offset from the central portion; and securing means for non-rotatably mounting said central portion to said outer end so that said disk blade and said shaft member rotate together about said axis and said plane intersects said bearing.

3. A disk assembly supportable on a frame structure comprising: a bearing support member mounted on the frame structure and having a horizontal opening therein and an outer surface extending radially outwardly from the opening; a bearing having inner and outer races, the outer race having opposite edges with one edge thereof being seated against said outer surface and the inner race having an extending portion that projects to an outer end axially outwardly offset with respect to the other edge of said outer race; a bearing cap fixed to the bearing support fixedly attached to said outer race to prevent rotation thereof and having an axially extending annular portion positioned alongside the outer surface of said outer race and a radial flange extending inwardly from the axially extending annular portion and disposed alongside said other edge of the outer race; a shaft member extending through said inner race and having a head disposed in the opening of the bearing support and bearing against the respective adjacent end of said inner race, said shaft having an outer end portion at least part of which is threaded projecting axially beyond said outer end of said inner race, a dirt cap mounted on the outer end portion of said shaft and having a radial portion bearing against the outer end of the inner race and extending radially beyond said annular portion of said bearing cap to an integral annular axially extending portion that is radially outward of at least a part of said annular portion of said bearing cap; a disk mounted on the outer end portion of said shaft alongside the dirt cap; and means including a threaded member complementary to said threaded part of said shaft for fixing said shaft, inner race, dirt shield and disk to rotate in unison.

* * * * *